US010331949B2

(12) United States Patent
Bellert

(10) Patent No.: US 10,331,949 B2
(45) Date of Patent: Jun. 25, 2019

(54) SPLITTING MERGED TABLE CELLS

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 185 days.

(21) Appl. No.: 15/658,796

(22) Filed: Jul. 25, 2017

(65) Prior Publication Data

US 2019/0034719 A1    Jan. 31, 2019

(51) Int. Cl.
*G06K 9/00* (2006.01)
*G06F 17/24* (2006.01)
*G06K 9/46* (2006.01)

(52) U.S. Cl.
CPC ....... *G06K 9/00463* (2013.01); *G06F 17/245* (2013.01); *G06K 9/00449* (2013.01); *G06K 9/4638* (2013.01)

(58) Field of Classification Search
CPC combination set(s) only.
See application file for complete search history.

(56) References Cited

U.S. PATENT DOCUMENTS

| 6,626,955 | B1* | 9/2003 | Agrawal | G06F 17/24 382/187 |
| 7,412,094 | B2* | 8/2008 | Chen | G06F 3/03545 382/151 |
| 7,664,325 | B2* | 2/2010 | Lin | G06K 9/00416 382/179 |
| 9,697,423 | B1* | 7/2017 | Bellert | G06K 9/00456 |
| 2006/0061778 | A1* | 3/2006 | Chen | G06F 3/0488 358/1.8 |
| 2009/0245645 | A1* | 10/2009 | Xing | G06F 17/245 382/189 |
| 2014/0029853 | A1* | 1/2014 | Xue | G06K 9/18 382/182 |
| 2017/0148140 | A1* | 5/2017 | Bellert | G06K 9/00463 |

* cited by examiner

*Primary Examiner* — Tsung Yin Tsai
(74) *Attorney, Agent, or Firm* — Osha Liang LLP

(57) ABSTRACT

A method for image processing is provided. The method includes: obtaining an image including a table that includes a plurality of cells that each includes a first border, a second border opposite the first border, a third border, and a fourth border opposite the third border; identifying, on a skeleton graph generated for the table, a first non-corner vertex on the first border of a first cell of the plurality of cells; determining a first plurality of splitlines extending from the first non-corner vertex and intersecting with the second border of the first cell without intersecting with the third or fourth border of the first cell; calculating a first plurality of confidence values for the first plurality of splitlines; and splitting the first cell by generating a first artificial edge, based on the first plurality of confidence values and a splitline of the first plurality of splitlines.

20 Claims, 18 Drawing Sheets

FIG. 3C

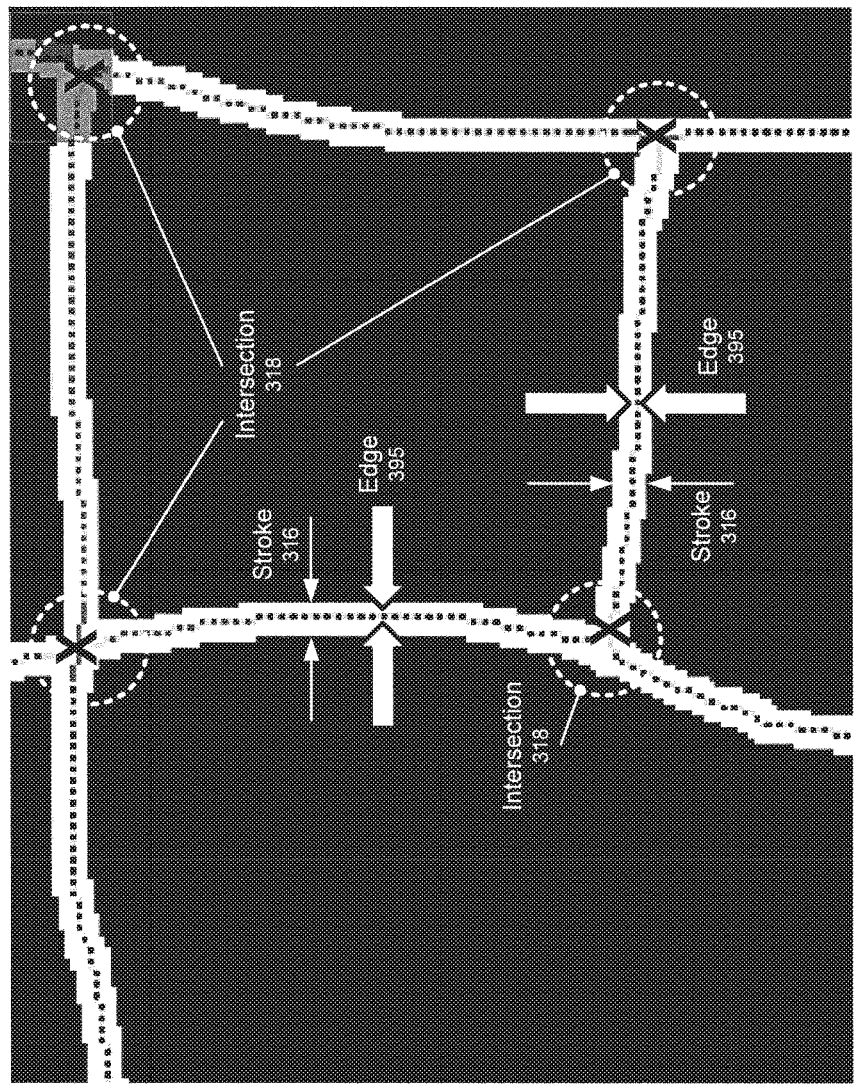

| Possible SplitLines | | |
|---|---|---|
| | EASTERN SplitLines leaving vertex 22 | I-SplitLine to vertex 19 w/ conf 0.97. |
| | EASTERN SplitLines leaving vertex 15 | I-SplitLine to vertex 16 w/ conf 0.72. |
| | | I-SplitLine to vertex 16 w/ conf 0.89. |
| | | I-SplitLine to vertex 19 w/ conf 0.7. |
| | EASTERN SplitLines leaving vertex 35 | P-SplitLine to point (1030, 716) w/ conf 0.9. |
| | EASTERN SplitLines leaving vertex 33 | P-SplitLine to point (1032, 610) w/ conf 0.9. |
| | EASTERN SplitLines leaving vertex 30 | P-SplitLine to point (1034, 469) w/ conf 0.9. |
| | WESTERN SplitLines leaving vertex 12 | P-SplitLine to point (60, 163) w/ conf 0.9. |
| | WESTERN SplitLines leaving vertex 19 | I-SplitLine to vertex 22 w/ conf 0.97. |
| | | I-SplitLine to vertex 15 w/ conf 0.7. |
| | WESTERN SplitLines leaving vertex 16 | I-SplitLine to vertex 15 w/ conf 0.9. |
| | | I-SplitLine to vertex 22 w/ conf 0.72. |
| | WESTERN SplitLines leaving vertex 32 | P-SplitLine to point (73, 593) w/ conf 0.9. |

Possible Splitline Data Structure 416

FIG. 4G

| Possible SplitLines | WESTERN *SplitLines* leaving vertex 32 | *p-SplitLine* to point (73, 593) w/ conf 0.9. |
|---|---|---|
| | EASTERN *SplitLines* leaving vertex 30 | *p-SplitLine* to point (1034, 469) w/ conf 0.9. |
| | EASTERN *SplitLines* leaving vertex 33 | *p-SplitLine* to point (1032, 610) w/ conf 0.9. |
| | WESTERN *SplitLines* leaving vertex 12 | *p-SplitLine* to point (60, 163) w/ conf 0.9. |
| | EASTERN *SplitLines* leaving vertex 35 | *p-SplitLine* to point (1030, 716) w/ conf 0.9. |
| | WESTERN *SplitLines* leaving vertex 19 | *I-SplitLine* to vertex 22 w/ conf 0.97. |
| | | *I-SplitLine* to vertex 15 w/ conf 0.7. |
| | EASTERN *SplitLines* leaving vertex 15 | *I-SplitLine* to vertex 16 w/ conf 0.89. |
| | | *I-SplitLine* to vertex 19 w/ conf 0.7. |
| | WESTERN *SplitLines* leaving vertex 16 | *I-SplitLine* to vertex 15 w/ conf 0.9. |
| | | *I-SplitLine* to vertex 22 w/ conf 0.72. |
| | EASTERN *SplitLines* leaving vertex 22 | *I-SplitLine* to vertex 19 w/ conf 0.97. |
| | | *I-SplitLine* to vertex 16 w/ conf 0.72. |

Possible Splitline Data Structure 416

FIG. 4H

| Final Splitlines | p-SplitLine from vertex 32 to point (73, 593) w/ conf 0.9. | p-SplitLine from vertex 30 to point (1034, 469) w/ conf 0.9. | p-SplitLine from vertex 33 to point (1032, 610) w/ conf 0.9. | p-SplitLine from vertex 12 to point (60, 163) w/ conf 0.9. | p-SplitLine from vertex 35 to point (1030, 716) w/ conf 0.9. | I-SplitLine from vertex 19 to vertex 22 w/ conf 0.97. | I-SplitLine from vertex 15 to vertex 16 w/ conf 0.89. |
|---|---|---|---|---|---|---|---|

Final Splitline Data Structure 418

FIG. 4I

SPLITTING MERGED TABLE CELLS

BACKGROUND

An image may include a table with rows and columns bounded by hand-drawn lines. For example, the image may be a scan of a hand-drawn page. As another example, the image may be a photograph of a writing board on which a table has been drawn with markers. These hand-drawn lines are rarely straight, making it difficult for image processing devices to determine the geometry of the table (e.g., upper left corner, extents, number of rows and columns, cell positions). These hand-drawn lines also make it difficult to generate a high-level representation of the table that can be included in an electronic document (e.g., word processing document, spreadsheet, slide show, webpage, etc.). Regardless, users still wish to have image processing devices operate on hand-drawn tables or any table in an image.

SUMMARY

In general, in one aspect, the invention relates to a method for image processing. The method comprises: obtaining an image comprising a table comprising a plurality of cells, wherein each cell in the plurality of cells comprises a first border, a second border opposite the first border, a third border, and a fourth border opposite the third border; identifying, on a skeleton graph with a plurality of vertices generated for the table, a first non-corner vertex on the first border of a first cell of the plurality of cells; determining a first plurality of splitlines extending from the first non-corner vertex and intersecting with the second border of the first cell without intersecting with the third or fourth border of the first cell; calculating a first plurality of confidence values for the first plurality of splitlines; and splitting the first cell by generating a first artificial edge, based on the first plurality of confidence values and a splitline of the first plurality of splitlines.

In general, in one aspect, the invention relates to a system for image processing. The system comprises: a memory; and a computer processor connected to the memory that: stores an image comprising a table comprising a plurality of cells, wherein each cell in the plurality of cells comprises a first border, a second border opposite the first border, a third border, and a fourth border opposite the third border; identifies, on a skeleton graph generated with a plurality of vertices for the table, a first non-corner vertex on the first border of a first cell of the plurality of cells; determines a first plurality of splitlines extending from the first non-corner vertex and intersecting with the second border of the first cell without intersecting with the third or fourth border of the first cell; calculates a first plurality of confidence values for the first plurality of splitlines; and splits the first cell by generating a first artificial edge, based on the first plurality of confidence values and a splitline of the first plurality of splitlines.

In general, in one aspect, the invention relates to a non-transitory computer readable medium (CRM) storing computer readable program code embodied therein. The program code, when executed: obtains an image comprising a table comprising a plurality of cells, wherein each cell in the plurality of cells comprises a first border, a second border opposite the first border, a third border, and a fourth border opposite the third border; identifies, on a skeleton graph with a plurality of vertices generated for the table, a first non-corner vertex on the first border of a first cell of the plurality of cells; determines a first plurality of splitlines extending from the first non-corner vertex and intersecting with the second border of the first cell without intersecting with the third or fourth border of the first cell; calculates a first plurality of confidence values for the first plurality of splitlines; and splits the first cell by generating a first artificial edge, based on the first plurality of confidence values and a splitline of the first plurality of splitlines.

Other aspects of the invention will be apparent from the following description and the appended claims.

BRIEF DESCRIPTION OF DRAWINGS

FIGS. 3A-3C show an implementation example in accordance with one or more embodiments of the invention.

FIGS. 4A-4K show an implementation example in accordance with one or more embodiments of the invention.

DETAILED DESCRIPTION

Figure 1:
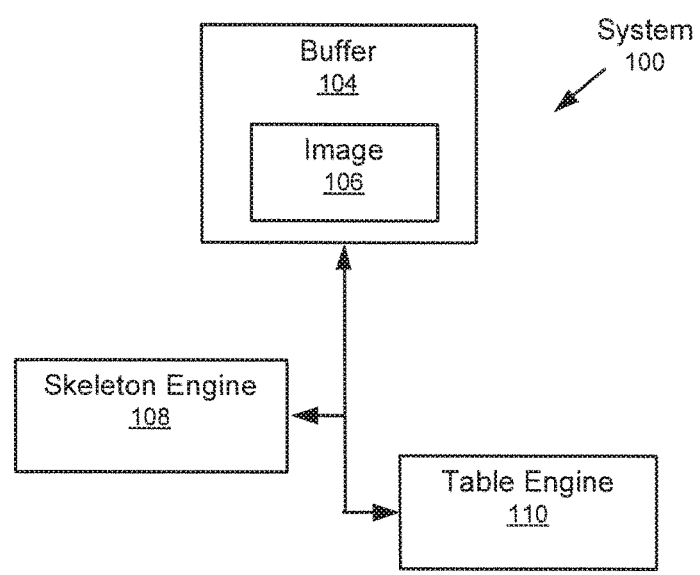
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of image processing for splitting merged cells in a hand-drawn table. Specifically, an image including a table with one or more merged cells is obtained. The image is converted into a mask, and a skeleton graph that includes edges and vertices representing the table is generated. One or more processes are executed on the skeleton graph to recreate the table after the splitting of the merged cells. These one or more processes may add artificial edges to the skeleton graph, where each artificial edge corresponds to the border of a cell(s) after the splitting. With the original borders known, a high-level representation of the table may be generated for inclusion in an electronic document (e.g., OOXML document, PDF document, etc.). The high-level representation may have attributes and/or tags for each cell, even cells that have been merged with other cells. When the electronic document is rendered (e.g., displayed, printed) the new (post-splitting) table may be visible and/or the pre-splitting table (i.e., the table as it appears in the obtained image) may be visible.

FIG. 1 shows a system (100) in accordance with one or more embodiments of the invention. As shown in FIG. 1, the system (100) has multiple components, including, for example, a buffer (104), a skeleton engine (108), and a table engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an image (106) including a table having any number of rows and columns. Each cell of the table may have text and/or graphics. The image (106) may be obtained (e.g., downloaded, scanned, etc.) from any source. Further, the image (106) may be of any size and in any format (e.g., JPEG, GIF, BMP, PNG, etc.). In one or more embodiments, the image (106) includes a writing board (e.g., blackboard, whiteboard, etc.), and the table is drawn on the writing board with a marker. In one or more embodiments of the invention, the table has one or more merged cells. These cells may have been deliberately merged (e.g., to display content exceeding the size of a non-merged cell).

In one or more embodiments of the invention, the skeleton engine (108) may be implemented in hardware (i.e., circuitry), software, or any combination thereof. The skeleton engine (108) converts the image (106) to a mask (e.g., a binary image) in order to facilitate the identification of hand-drawn lines in the table and/or text characters in the table.

Those skilled in the art, having the benefit of this detailed description, will appreciate that a standard coordinate system for the image (106) may exist. However, if the hand-drawn table is rotated within the image (106), the axes of this standard coordinate system might not align with the rows and columns of the table. In one or more embodiments of the invention, the skeleton engine (108) establishes a custom coordinate system with perpendicular axes that closely align with the rows and columns of the table in the image (106). Alternatively, the table may be rotated to better align the rows and columns of the table with the standard coordinate system of the image (106).

In one or more embodiments of the invention, the skeleton engine (108) generates a skeleton graph for the table in the image (106). The skeleton graph includes a series of edges and vertices that represent the hand-drawn table. Each edge may correspond to a stroke, or a portion of a stroke, of the table and each vertex may correspond to an intersection of two or more edges. In other words, the edges are separated by the vertices. Further, an edge may contain a path of pixels from one end of the stroke to the other end of the stroke, located approximately at the center of the stroke. In one or more embodiments, the width of the path is 1 pixel. In one or more embodiments of the invention, the width of the path is multiple pixels.

In one or more embodiments of the invention, the edges of the skeleton graph represent the borders of the visible cells in the table. Each cell in the table may have four borders in different cardinal directions (e.g., north, east, south, west). The skeleton engine (108) assigns a unique identifier to each cell and vertex. For example, the unique identifier may be a whole number. In one or more embodiments, one set of whole numbers is used for the cells and a different set of whole numbers is used for the vertices.

In one or more embodiments of the invention, a merged cell is a cell that shares one of its borders (e.g., west border) with multiple other cells (i.e., neighbor cells). A border (e.g., south border) of a neighboring cell may intersect (i.e., make contact with) a border of the merged cell (e.g., western border). If this intersection does not occur at a corner of the merged cell, this intersection is referred to as a "non-corner vertex" (discussed below in reference to FIG. 4B) of the merged cell.

In one or more embodiments of the invention, the table engine (110) may be implemented in hardware (i.e., circuitry), software, or any combination thereof. The table engine (110) is configured to identify and split merged cells.

In one or more embodiments of the invention, the table engine (110) selects a cardinal direction (e.g., West). Then, the table engine (110) scans the table to identify: (i) all non-corner vertices on the western borders of the merged cells (i.e., western non-corner vertices); and (ii) all non-corner vertices on the eastern (i.e., opposite cardinal direction of the selected cardinal direction) borders of the merged cells (i.e., eastern non-corner vertices).

In one or more embodiments of the invention, the table engine (110) utilizes one or more data structures (e.g., arrays). Each entry in a data structure may correspond to a non-corner vertex and may store the unique identifier of the non-corner vertex and the unique identifier of the merged cell to which the non-corner vertex belongs. The non-corner vertices may be stored in any order. Alternatively, the non-corner vertices are stored in the order of being identified by the table engine (110). The order that the non-corner vertices are identified starts from the first identified non-corner vertex followed by the subsequent non-corner vertices identified as the table engine (110) performs a clockwise or counter clockwise scan until all non-corner vertices in the table are identified.

In one or more embodiments of the invention, the table engine (110) selects one of the identified non-corner vertices. The table engine (110) generates a geometric line between the selected non-corner vertex and all of the identified non-corner vertices in the opposite cardinal direction. For example, if a western non-corner vertex is selected, geometric lines are generated between the selected western non-corner vertex and each eastern non-corner vertex in the data structure(s). As another example, if a northern non-corner vertex is selected, geometric lines are generated between the selected northern non-corner vertex and each southern non-corner vertex in the data structure(s). These geometric lines (i.e., geometric lines that start and terminate at non-corner vertices) are referred to as "internal splitlines" or "I-splitlines." This may be repeated for all identified non-corner vertices. The set of internal splitlines emanating from the selected non-corner vertex along with the ending vertex for each internal splitline is stored in the entry of the data structure for the non-corner vertex.

In one or more embodiments, the table engine (110) discards one or more of the internal splitlines. Specifically, if an internal splitline for a non-corner vertex of a merged cell does not intersect with the opposite border of the merged cell and/or if the internal splitline intersects with an invalid border, the internal splitline is discarded. In one or more embodiments, the invalid border is a border of any cell in the table that is not substantially parallel with the border of the merged cell the non-corner vertex belongs to. In other words, if the border the non-corner vertex belongs to is a vertical border of the merged cell, the internal splitline may not intersect with (i.e., cross and/or make contact with) a horizontal border of any cell in the table. For example, assume there exists a merged cell with a western non-corner vertex. If a splitline from the western non-corner vertex does not intersect with (i.e., cross and/or make contact with) the eastern border of the merged cell and/or if the splitline from the western non-corner vertex intersects with (i.e., crosses and/or makes contact with) a northern or southern border of any cell in the table, the splitline is discarded. As another example, assume there exists a merged cell with a southern non-corner vertex. If a splitline from the southern non-corner vertex does not intersect with (i.e., cross and/or make contact with) the northern border of the merged cell and/or if the splitline from the southern non-corner vertex intersects with (i.e., crosses and/or makes contact with) an eastern or western border of any cell in the table, the splitline is discarded.

In one or more embodiments of the invention, the table engine (110) generates a geometric line from each non-corner vertex to the perimeter of the table. These geometric lines are referred to as "perimeter splitlines" or "P-splitlines." Each perimeter splitline travels in the direction of one of the custom cardinal directions and does not intersect with (i.e., cross and/or make contact with) a border of any cell in the table that is not substantially parallel with the border of the merged cell where the perimeter splitline starts. Specifically, the direction of travel for a perimeter splitline is opposite to the custom cardinal direction of the border where the non-corner vertex is located. In other words, a perimeter splitline originating from a vertical border of a merged cell may only intersect with (i.e., cross and/or make contact with) vertical borders of the cells in the table as the perimeter splitline travels in the cardinal direction to the perimeter of the table. Similarly, a perimeter splitline originating from a horizontal border of a merged cell may only intersect with (i.e., cross and/or make contact with) horizontal borders of the cells in the table as the perimeter splitline travels in the cardinal direction to the perimeter of the table. For example, in the case of a western non-corner vertex, the perimeter splitline starts at the western non-corner vertex and travels east until reaching the perimeter of the table. In the event that the perimeter splitline intersects with (i.e., crosses and/or makes contact with) a northern or southern border of any cell in the table, the perimeter splitline is not generated. As another example, in the case of a southern non-corner vertex, the perimeter splitline starts at the southern non-corner vertex and travels north until reaching the perimeter of the table. In the event that the perimeter splitline intersects with (i.e., crosses and/or makes contact with) an eastern or western border of any cell in the table, the perimeter splitline is not generated. The table engine (110) stores each perimeter splitline along with its terminal point (e.g. coordinates) for the selected non-corner vertex in the same data structure storing the internal splitlines.

In one or more embodiments of the invention, the splitlines (internal splitlines and perimeter splitlines) in this data structure represent all possible splitlines that may be replaced with one or more artificial edges to split one or more merged cells in the table. This data structure storing these splitlines is referred to as the "possible splitlines data structure." The splitlines and the respective non-corner vertices in the possible splitlines data structure are sorted by the table engine (110) as discussed with further detail in reference to FIGS. 2A-2C and 4G and 4H.

In one or more embodiments of the invention, the table engine (110) calculates a confidence value for each of the splitlines. The confidence value provides a measure of how closely the splitline corresponds to a theoretical line that splits one or more merged cells. The confidence value may be a score ranging from 0 to 1, with 1 being interpreted as the highest score. The confidence value of a splitline is calculated based on the splitline's length. The length of an internal splitline is the Euclidean distance or, alternatively, the number of pixels between the two non-corner vertices. The length of a perimeter splitline is the Euclidean distance, or alternatively, the number of pixels between the non-corner vertex and the point on the perimeter of the table. The shorter the length, the higher the confidence value. For example, a shorter splitline would potentially intersect with (i.e., cross and/or make contact with) less cells and/or characters and texts in the cells of the hand-drawn table and therefore result in a more accurate splitting of the merged cell. As another example, a splitline with a shorter length is more likely to connect two non-corner vertices, which has priority over connecting a non-corner vertex with a point on the hand-drawn table (e.g., a point on the perimeter of the hand-drawn table).

In one or more embodiments of the invention, the confidence value of a splitline is also based on the angle between the splitline's travel direction and the closest axis of the custom coordinate system (i.e., how well the splitline's travel direction matches with the cardinal direction of the custom coordinated system that the splitline is intended to travel). The travel direction of the splitline is the direction of a vector that starts at the non-corner vertex and points away from the non-corner vertex along the direction of the splitline. The closer the angle is to zero, the higher the confidence value.

In one or more embodiments of the invention, the confidence score for a splitline may be calculated as:

$$\text{confidence\_score} = (\text{weight\_1} \times \text{length\_score}) + (\text{weight\_2} \times \text{angle\_score}).$$

Weight_1 and weight_2 may be any positive value less than 1 and the sum of the values of weight_1 and weight_2 is equal to 1. In the event that the hand-drawn table closely matches a template table having straight lines, the value of weight_2 may be set to be greater than the value of weight_1.

The length_score represents the proportion of the length of the splitline ("splitline_length") to the dimensions of the image containing the hand-drawn table. The dimension of the image ("image_dimension") may be a diagonal length of the image. Alternatively, the image_dimension for a splitline extending in a horizontal direction may be a horizontal dimension of the image (i.e., the length of the image) and the image_dimension for a splitline extending in a vertical direction may be a vertical dimension of the image (i.e., the height of the image). For example, the length_score may be calculated as:

$$\text{length\_score} = (\text{image\_dimension} - \text{splitline\_length}) \div \text{image\_dimension}.$$

The angle_score represents the proportion of an angular_difference value subtracted by 45 degrees to 45 degrees, where the angular_difference value is the absolute value of the difference between the angle of the splitline ("splitline_angle") and the angle of the closest axis of the custom coordinate system ("closest_ccs_axis"). For example, the angle_score may be calculated as:

$$\text{angle\_score} = (45 \text{ degrees} - |\text{splitline\_angle} - \text{closest\_ccs\_axis}|) \div 45 \text{ degrees}.$$

In one or more embodiments of the invention, the method for calculating the confidence value is not limited to the example described above. Other methods that take into account a number of cells the splitline crosses, a number of characters and texts the splitline crosses, the angle of the splitline, and a position of the terminal ends of the splitline with respect to the edges (i.e., strokes) of the hand-drawn table may be used to calculate the confidence value of the splitline.

In one or more embodiments of the invention, the table engine (110) identifies all non-corner vertices that have only a single splitline (i.e., only one splitline extends from the non-corner vertex). These splitlines are moved from the possible splitline data structure to another data structure, referred to as a "final splitline data structure." Eventually, one or more artificial edges are generated for each of these splitlines stored in the final splitline data structure and added to the skeleton graph. An artificial edge will be added for each portion of the splitline between intersections with cell borders and the set as a whole has the same terminal ends as the splitline it is replacing. For example, if an existing edge exists between two non-corner vertices or between a non-corner vertex and a point on the perimeter of the table (i.e., if an intervening edge exists between two points on the table to be connected by an artificial edge), the table engine 110 will generate a first artificial edge from the first point to the intervening edge and a second artificial edge from the intervening edge to the second point.

In one or more embodiments of the invention, for a non-corner vertex with multiple splitlines, the table engine (110) selects the splitline with the highest confidence value to be moved to the final splitline data structure. If the selected splitline overlaps with an internal splitline from another non-corner vertex, and if both splitlines have the highest confidence values for their respective non-corner vertices, one splitline is discarded and one is selected for replacement by an artificial edge. For example, assume non-corner vertex A has multiple splitlines: X1, X2, X3. Further, assume non-corner vertex B also has multiple splitlines: Y1, Y2. Now, assume that X2 has the highest confidence value compared with the confidence values of X1 and X3. Also assume that Y1 has the highest confidence value compared with the confidence value of Y2. Finally, assume that X2 and Y1 overlap (i.e., X2 extends from non-corner vertex A to non-corner vertex B, and Y1 extends from non-corner vertex B to non-corner vertex A). Because X2 and Y1 overlap, and because X2 has the highest confidence score for non-corner vertex A while Y1 has the highest confidence score for non-corner vertex B, one of X2 and Y1 is discarded, while the other is replaced with one or more artificial edges. The non-corner vertex associated with the discarded splitline is removed from further consideration, even if this removed non-corner vertex has other splitlines.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

FIG. 2 shows a flowchart in accordance with one or more embodiments of the invention. The flowchart depicts a process for image processing. Specifically, the flowchart depicts a process for splitting merged cells in an identified hand-drawn table. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

In one or more embodiments of the invention, one or more of the steps shown in FIG. 2 are described based on the initial selection of the west cardinal direction. In one or more embodiments, the steps shown in FIG. 2 may be repeated for the north or south cardinal direction.

Figure 2A:
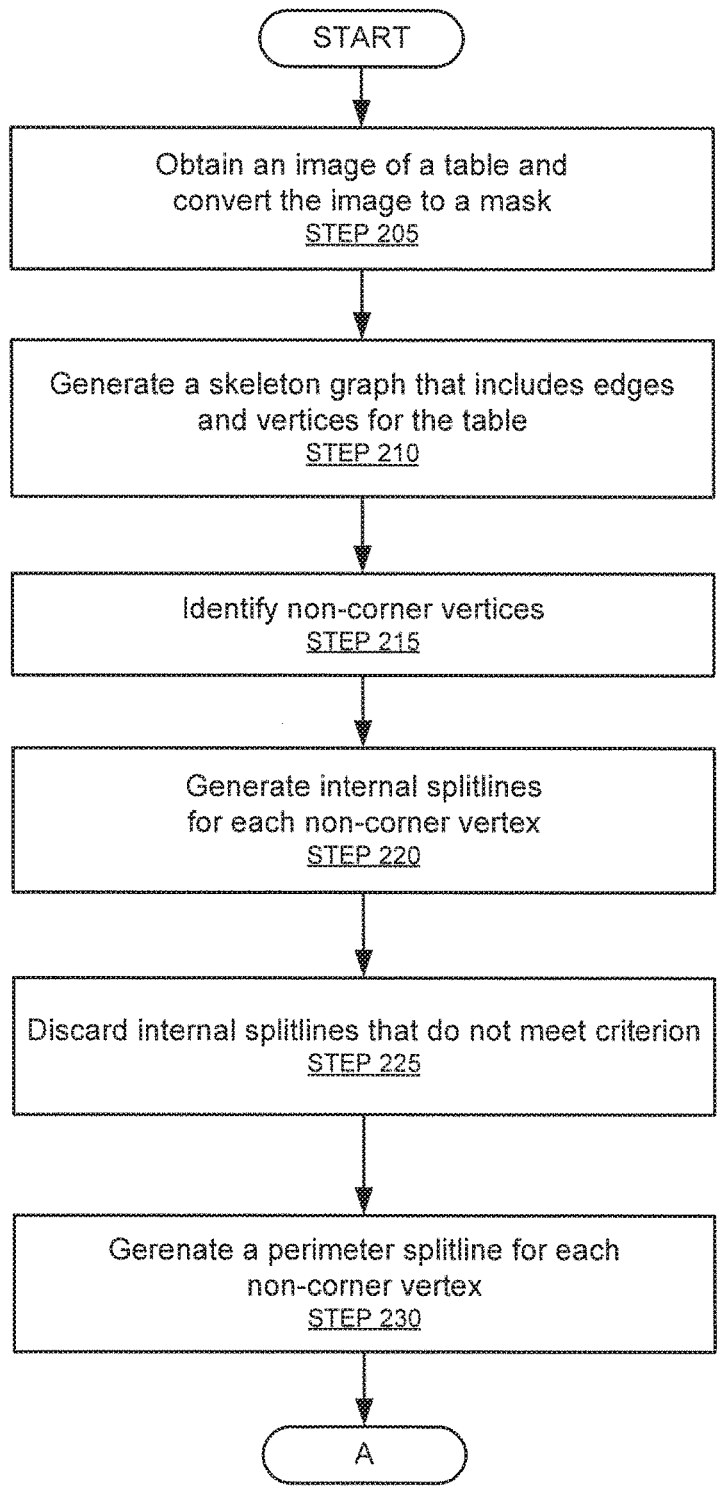
FIGS. 2A-2C show a flowchart in accordance with one or more embodiments of the invention.

Referring to FIG. 2A, initially, an image including a table is obtained (STEP 205). The image may be obtained (e.g., downloaded, scanned, etc.) from any source and may be of any size or format. For example, the image may include a writing board and the table is hand-drawn on the writing board. Additionally or alternatively, the image may be a scan of a hardcopy document, where the table is visible in the hardcopy document and the table was computer-generated. Due to the nature of strokes drawn by hand and/or errors introduced during the scanning process, the rows and columns of the table are unlikely to be bounded by perfectly straight strokes.

In one or more embodiments, the table may include one or more merged cells. A merged cell is a cell that shares one of its borders (e.g., west border) with multiple other cells (i.e., neighbor cells). A border (e.g., south border) of a neighboring cell may intersect (i.e., make contact with) a border of the merged cell (e.g., western border). If this intersection does not occur at a corner of the merged cell, this intersection is referred to as "non-corner vertex" (discussed below in reference to FIG. 4B) of the merged cell.

In one or more embodiments of the invention, the image is converted into a mask (e.g., a binary image) to identify each stroke of the table and/or text characters in the table. Pixels corresponding to the strokes of the table may be set to 1, while all remaining pixels are set to 0. Further, the custom coordinate system, as described above in reference to FIG. 1, is established for the table. Alternatively, the table may be rotated to better align the rows and columns of the table with the standard coordinate system of the image.

In STEP 210, a skeleton graph is generated for the table. As discussed above, the skeleton graph may include sets of edges and vertices that represent the table. Each edge may correspond to a stroke, or a portion of a stroke, of the table and each vertex may correspond to an intersection of two or more edges. In other words, the vertices separate edges.

In STEP 215, all non-corner vertices, as discussed above in reference to FIG. 1, on the western and eastern borders of the merged cells within the table are identified and stored in a data structure (e.g., array).

In STEP 220, internal splitlines, as discussed above in reference to FIG. 1, are generated for each non-corner vertex identified in STEP 215. For example, if a western non-corner vertex (i.e., a non-corner vertex identified on a western border of a merged cell within the table) is selected, geometric lines are generated between the selected western non-corner vertex and each eastern non-corner vertex in the data structure(s). In one or more embodiments, the number of internal splitlines generated for a non-corner vertex may be zero. For example, if a selected western non-corner vertex does not have any eastern non-corner vertices to connect to, an internal splitline will not be generated for the selected western non-corner vertex.

In STEP 225, internal splitlines that do not meet a criterion are discarded. Specifically, if an internal splitline for a non-corner vertex of a merged cell does not intersect with the opposite border of the merged cell and/or if the internal splitline intersects with an invalid border, the internal splitline is discarded. In one or more embodiments, the invalid border is a border of any cell in the table that is not substantially parallel with the border of the merged cell the non-corner vertex belongs to. In other words, if the border the non-corner vertex belongs to is a vertical border of the merged cell, the internal splitline may not intersect with a horizontal border of any cell in the table. For example, assume there exists a merged cell with a western non-corner vertex. If a splitline from the western non-corner vertex does not intersect with (i.e., cross and/or make contact with) the eastern border of the merged cell and/or if the splitline from the western non-corner vertex intersects with (i.e., crosses and/or makes contact with) a northern or southern border of any cell in the table, the splitline is discarded.

In one or more embodiments of the invention, the remaining internal splitlines that are not discarded in STEP 225 are stored in a data structure referred to as a "possible splitline data structure" (i.e., array). This data structure represents all possible splitlines that may be replaced with one or more artificial edges to split one or more merged cells in the table.

In STEP 230, a perimeter splitline, as discussed above in reference to FIG. 1, is generated for all non-corner vertices identified in STEP 215. Each perimeter splitline travels in the direction of one of the custom cardinal directions and does not intersect with (i.e., cross and/or make contact with) a border of any cell in the table that is not substantially parallel with the border of the merged cell where the perimeter splitline starts. In other words, a perimeter splitline originating from a vertical border of a merged cell may only intersect with (i.e., cross and/or make contact with) vertical borders of the cells in the table as the perimeter splitline travels in the cardinal direction to the perimeter of the table. Specifically, the direction of travel for a perimeter splitline is opposite to the custom cardinal direction of the border where the non-corner vertex is located. For example, in the case of a western non-corner vertex, the perimeter splitline starts at the western non-corner vertex and travels east until reaching the perimeter of the table. In the event that the perimeter splitline intersects with (i.e., crosses and/or makes contact with) a northern or southern border of any cell in the table, the perimeter splitline is not generated. The perimeter splitlines are stored in the possible splitline data structure with the internal splitlines.

Figure 2B:
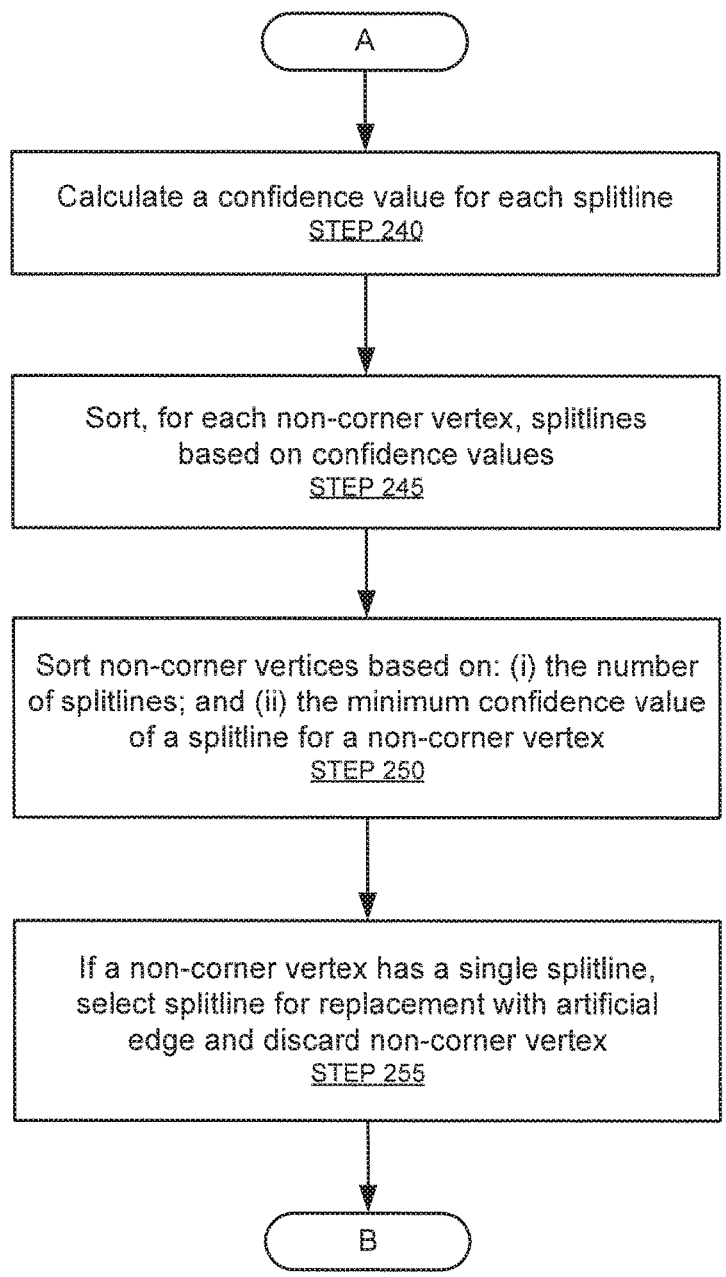

Referring now to FIG. 2B, in STEP 240, a confidence value, as discussed above in reference to FIG. 1, is calculated for each splitline (internal and perimeter) in the possible splitline data structure. The confidence value provides a measure of how closely the splitline corresponds to a theoretical line that splits one or more merged cells.

In one or more embodiments of the invention, the confidence value may be a score ranging from 0 to 1, with 1 being interpreted as the highest score. The confidence value of a splitline is calculated based on the splitline's length. The length of an internal splitline is the Euclidean distance or, alternatively, the number of pixels between the two non-corner vertices. The length of a perimeter splitline is the Euclidean distance, or alternatively, the number of pixels between the non-corner vertex and the point on the perimeter of the table. The shorter the length, the higher the confidence value. For example, a shorter splitline would potentially intersect with (i.e., cross and/or make contact with) less cells and/or characters and texts in the cells of the hand-drawn table and therefore result in a more accurate splitting of the merged cell. As another example, a splitline with a shorter length is more likely to connect two non-corner vertices, which has priority over connecting a non-corner vertex with a point on the hand-drawn table (e.g., a point on the perimeter of the hand-drawn table).

In one or more embodiments of the invention, the confidence value of a splitline is also based on the angle between the splitline's travel direction and the closest axis of the custom coordinate system (i.e., how well the splitline's travel direction matches with the cardinal direction of the custom coordinated system that the splitline is intended to travel). The travel direction of the splitline is the direction of a vector that starts at the non-corner vertex and points away from the non-corner vertex along the direction of the splitline. The closer the angle is to zero, the higher the confidence value.

In STEP 245, the splitlines in the possible splitlines data structure are sorted, for each non-corner vertex, in the order starting from highest confidence value at the front and the smallest confidence value at the back.

In STEP 250, the non-corner vertices in the possible splitline data structure are sorted based on: (i) the number of splitlines and (ii) the minimum confidence value of a splitline for a non-corner vertex. For example, the possible splitline data structure is sorted starting with all non-corner vertices with only a single splitline at the front and the non-corner vertices with the largest number of splitlines at the back. Further, the non-corner vertices with the same number of splitlines are sorted in the order starting from the non-corner vertices with the smallest minimum confidence value at the front to the non-corner vertices with the largest minimum confidence value at the back. This is described in further detail below in reference to FIGS. 4G and 4H.

In STEP 255, all non-corner vertices with only a single splitline are selected for replacement with one or more artificial edges and discarded from the possible splitline data structure. These selected splitlines are moved from the possible splitline data structure to another data structure, referred to as a "final splitline data structure." Eventually, one or more artificial edges are generated for each of these splitlines stored in the final splitline data structure and added to the skeleton graph. The artificial edge has the same terminal ends as the splitline it is replacing unless the artificial edge intersects (i.e., crosses) an existing edge of the table. For example, if an existing edge exits between two non-corner vertices or between a non-corner vertex and a point on the perimeter of the table (i.e., if an intervening edge exists between two points on the table to be connected by an artificial edge), a first artificial edge from the first point to the intervening edge will be generated before a second artificial edge from the intervening edge to the second point is generated.

Figure 2C:
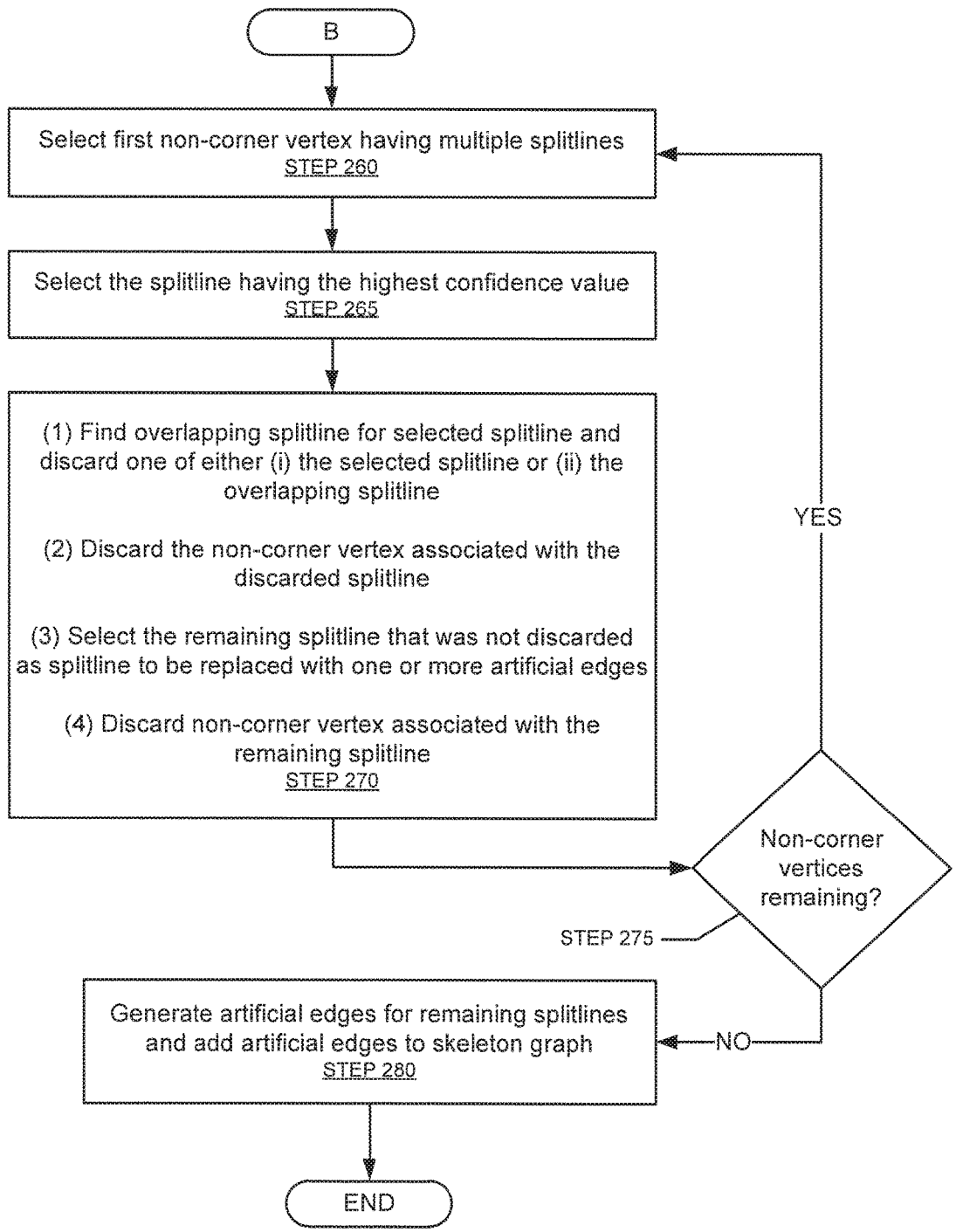

Turning now to FIG. 2C, in STEP 260, the first non-corner vertex remaining in the sorted possible splitline data structure is selected. This non-corner vertex will have multiple splitlines.

In STEP 265, the splitline of the non-corner vertex selected in STEP 260 with the highest confidence value is selected.

In STEP 270, if a splitline of a different non-corner vertex overlaps with the splitline selected in STEP 265 and the overlapping splitline has the highest confidence value for the different non-corner vertex, the overlapping splitline of the different non-corner vertex is identified. One of either (i) the splitline selected in STEP 265 or (ii) the splitline of the different non-corner vertex that overlaps with the splitline selected in STEP 265 is discarded from the possible splitline data structure. The non-corner vertex associated with the discarded splitline is also discarded from the possible splitline data structure. The remaining splitline that was not discarded is moved to the final splitline data structure to eventually be replaced with an one or more artificial edges. Once the remaining splitline is moved to the final splitline data structure, the non-corner vertex associated with the remaining splitline is discarded from the possible splitline data structure.

For example, as discussed above in reference to FIG. 1, assume non-corner vertex A has multiple splitlines: X1, X2, X3. Further, assume non-corner vertex B also has multiple splitlines: Y1, Y2. Now, assume that X2 has the highest confidence value compared with the confidence values of X1 and X3. Also assume that Y1 has the highest confidence value compared with the confidence value of Y2. Finally, assume that X2 and Y1 overlap (i.e., X2 extends from non-corner vertex A to non-corner vertex B, and Y1 extends from non-corner vertex B to non-corner vertex A). Because X2 and Y1 overlap, and because X2 has the highest confidence score for non-corner vertex A while Y1 has the highest confidence score for non-corner vertex B, one of X2 and Y1 is discarded, while the other is replaced with one or more artificial edges. The non-corner vertex associated with the discarded splitline is removed from further consideration, even if this removed non-corner vertex has other splitlines.

In STEP 275, a determination is made to determine whether there are any non-corner vertices remaining in the possible splitline data structure (i.e., if all non-corner vertices in the possible splitline data structure have not been discarded).

In the event that the determination in STEP 275 is YES, the process returns to STEP 260 and repeats until all non-corner vertices in the possible splitline data structure have been discarded.

In the event that the determination in STEP 275 is NO, the process proceeds to STEP 280 where sets of one or more artificial edges are generated for each splitline that has been moved from the possible splitline data structure to the final splitline data structure. In other words, all of the splitlines selected in STEPS 255-270 are replaced with one or more artificial edges. The artificial edges are added to the skeleton graph.

Figure 3A:
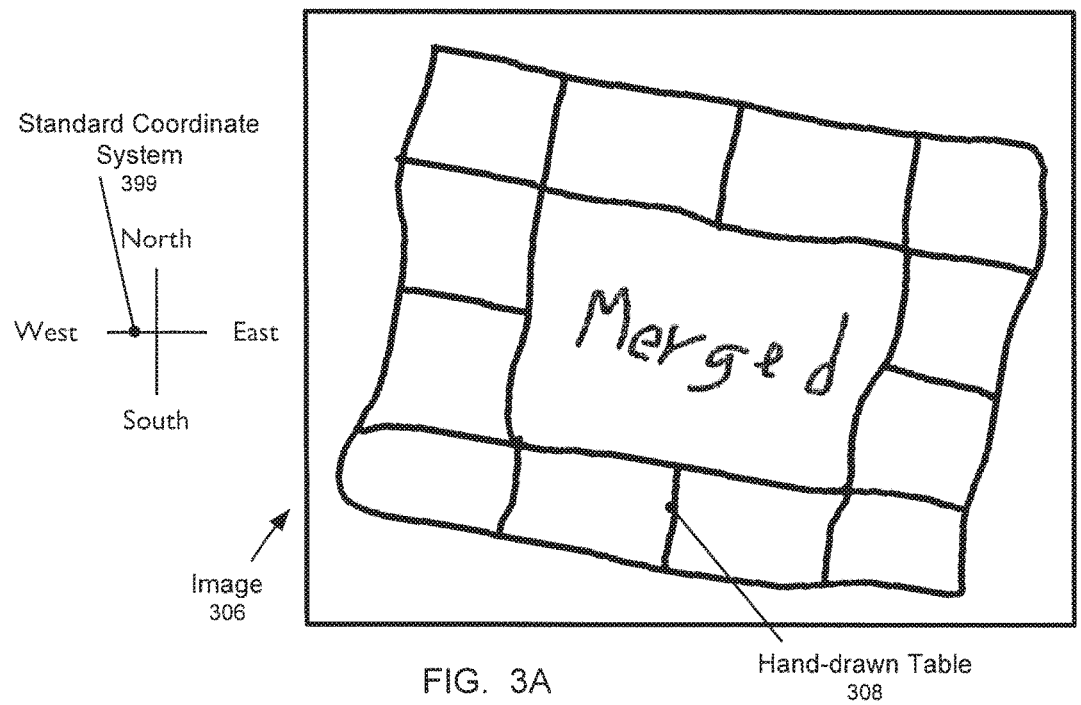
Figure 3B:
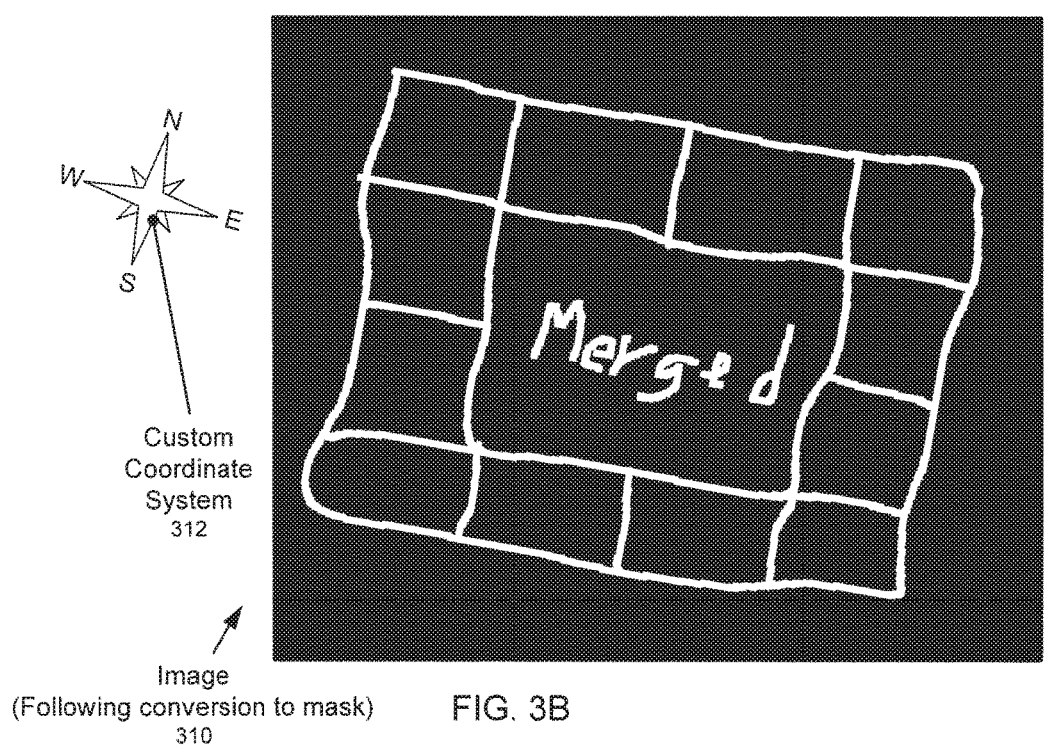

FIGS. 3A-3C show an implementation example in accordance with one or more embodiments of the invention. FIG. 3A shows an image (306) with a hand-drawn table (308). Specifically, the table (308) includes hand-drawn stokes that form the rows and columns. One or more cells of the table (308) may include text. Alternatively, one or more of the cells of the table may be merged. The hand-drawn table (308) may be drawn at an angle. In other words, the table (308) is not aligned with the standard coordinate system (399) for the image (306).

FIG. 3B shows the image (310) after it has been converted to a mask. Moreover, a custom coordinate system (312) has been established. This custom coordinate system (312) has axes that are better aligned with the rows and columns of the table (308) than the standard coordinate system (399).

FIG. 3C shows a partial skeleton graph (314) for the table. As shown in FIG. 3C, the rows and columns of the table are formed by multiple hand-drawn strokes (316). The skeleton graph (314) includes a set of edges (395) and vertices that represent the hand-drawn table. Each edge (395) corresponds to a stroke (316), or a portion of a stroke, of the hand-drawn table and each vertex may correspond to an intersection (318) of two or more edges (395). In other words, the edges (395) are separated by the vertices. Further, each edge (395) contains a path of pixels from one end of the stroke (316) to the other end of the stroke (316), located approximately at the center of the stroke. In FIG. 3C, the width of the path/edge is 1 pixel.

FIGS. 4A-4K show an implementation example in accordance with one or more embodiments of the invention.

Figure 4A:
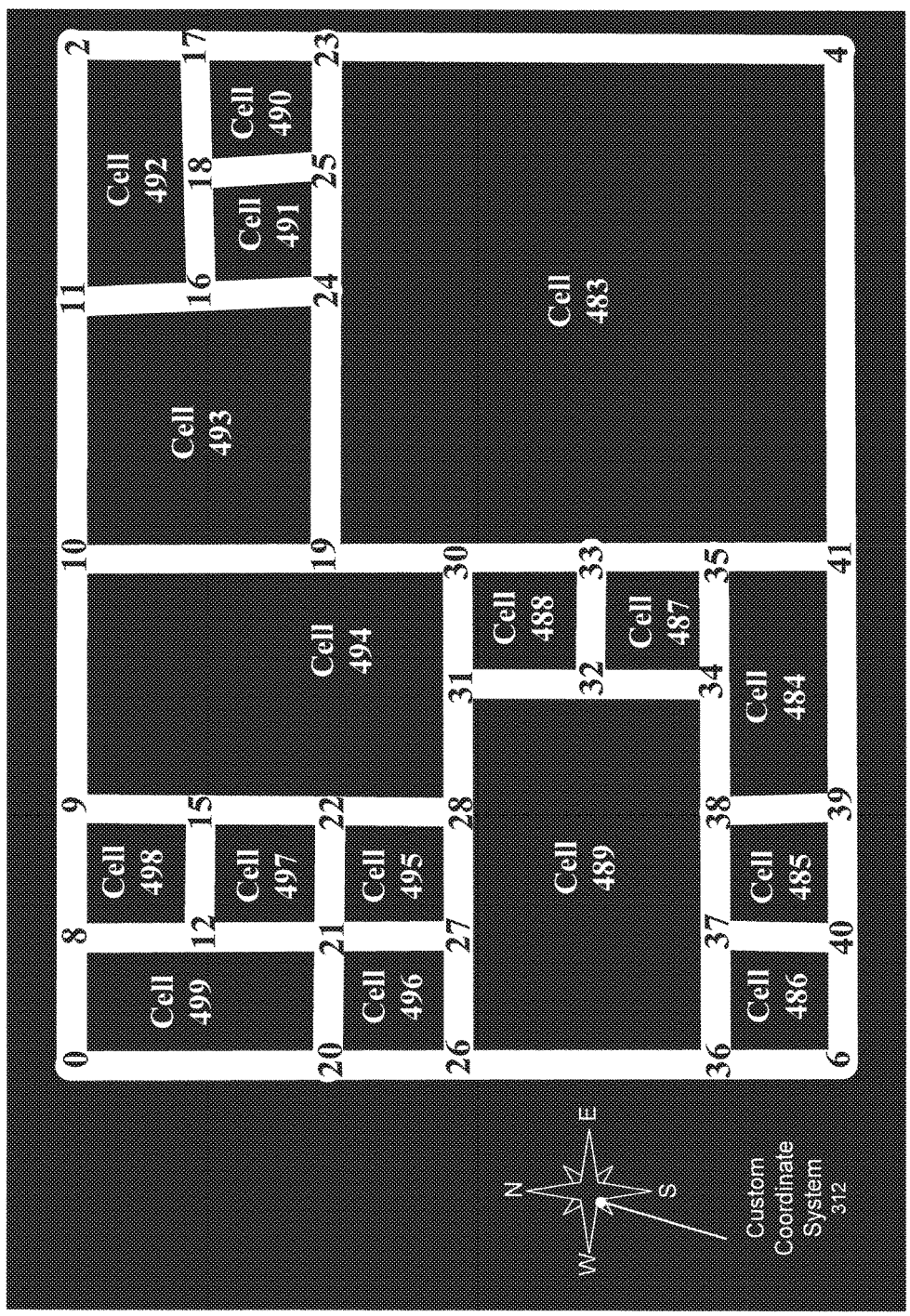

FIG. 4A shows the mask and an abstraction of the skeleton graph of a hand-drawn table (402) similar to the image (310) and skeleton graph (314) of hand-drawn table (308), as discussed above in reference to FIGS. 3A-3C. As seen in FIG. 4A, the hand-drawn table (402) includes multiple cells (483-499) with vertices (0-41) identified on the borders (i.e., edges) of the cells. Certain cells (483, 484, 489, 492, 493, 494, 499) are merged cells that include one or more of the actual cells of the hand-drawn table (402).

In one or more embodiments of the invention, the custom coordinate system (312) is aligned with the vertical and horizontal axes of the hand-drawn table (402).

Figure 4B:
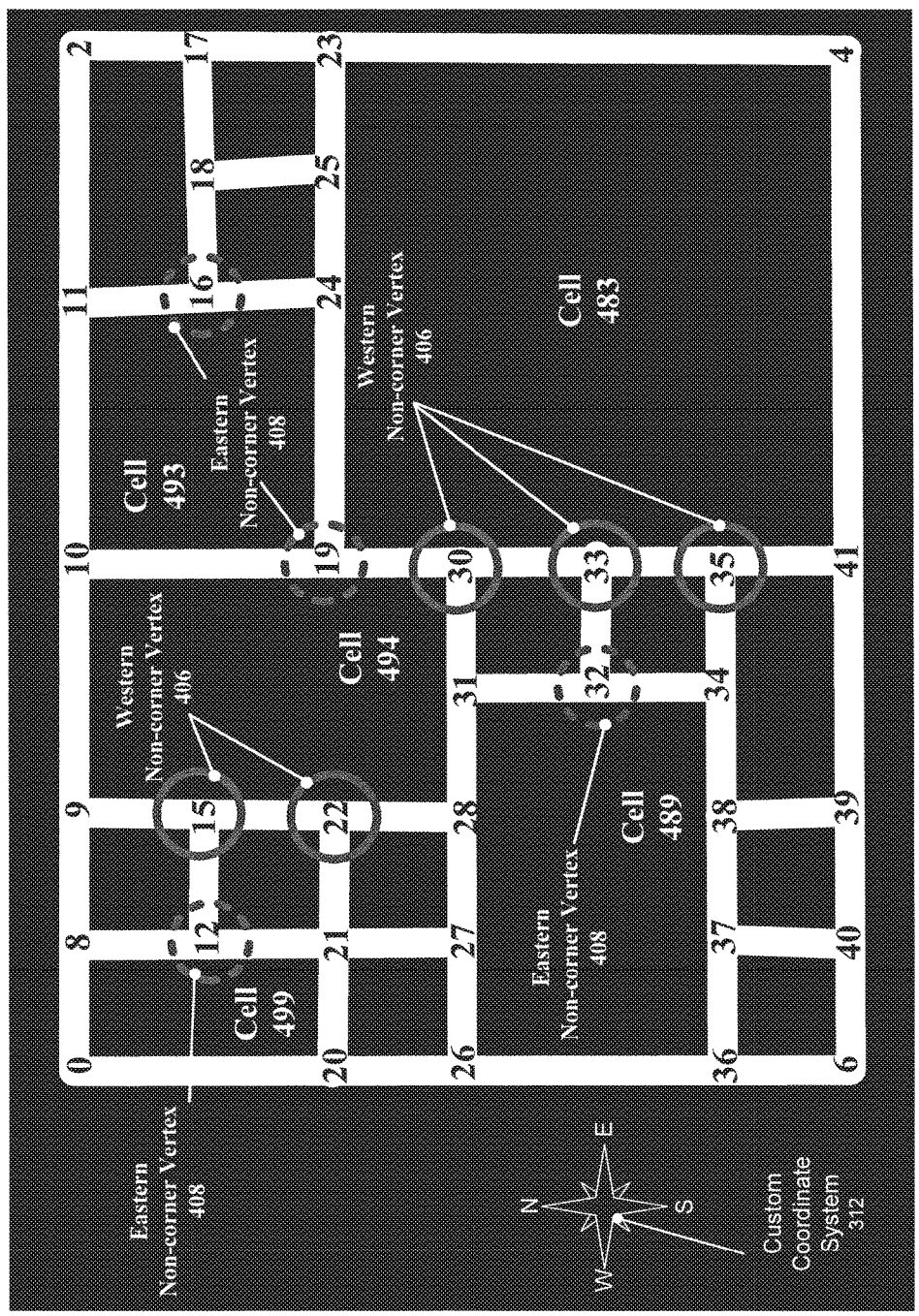

FIG. 4B shows the hand-drawn table (402) before the implementation of the merged cell splitting process as discussed above in reference to FIGS. 1 and 2A-2C. As seen in FIG. 4B, the selected cardinal direction can be either west or east. All of the western non-corner vertices (solid circle) (406) and the eastern non-corner vertices (dashed circles) (408) for each merged cells are identified.

Figure 4C:
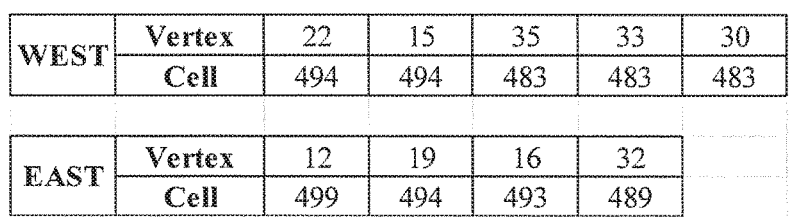

FIG. 4C shows data structures (410A, 410B) storing all of the western border non-corner vertices (406) and eastern border non-corner vertices (408) identified in FIG. 4B. As seen in FIG. 4C, each non-corner vertex is stored in the data structures (410A, 410B) with the corresponding merged cell that the non-corner vertex is associated with.

Figure 4D:
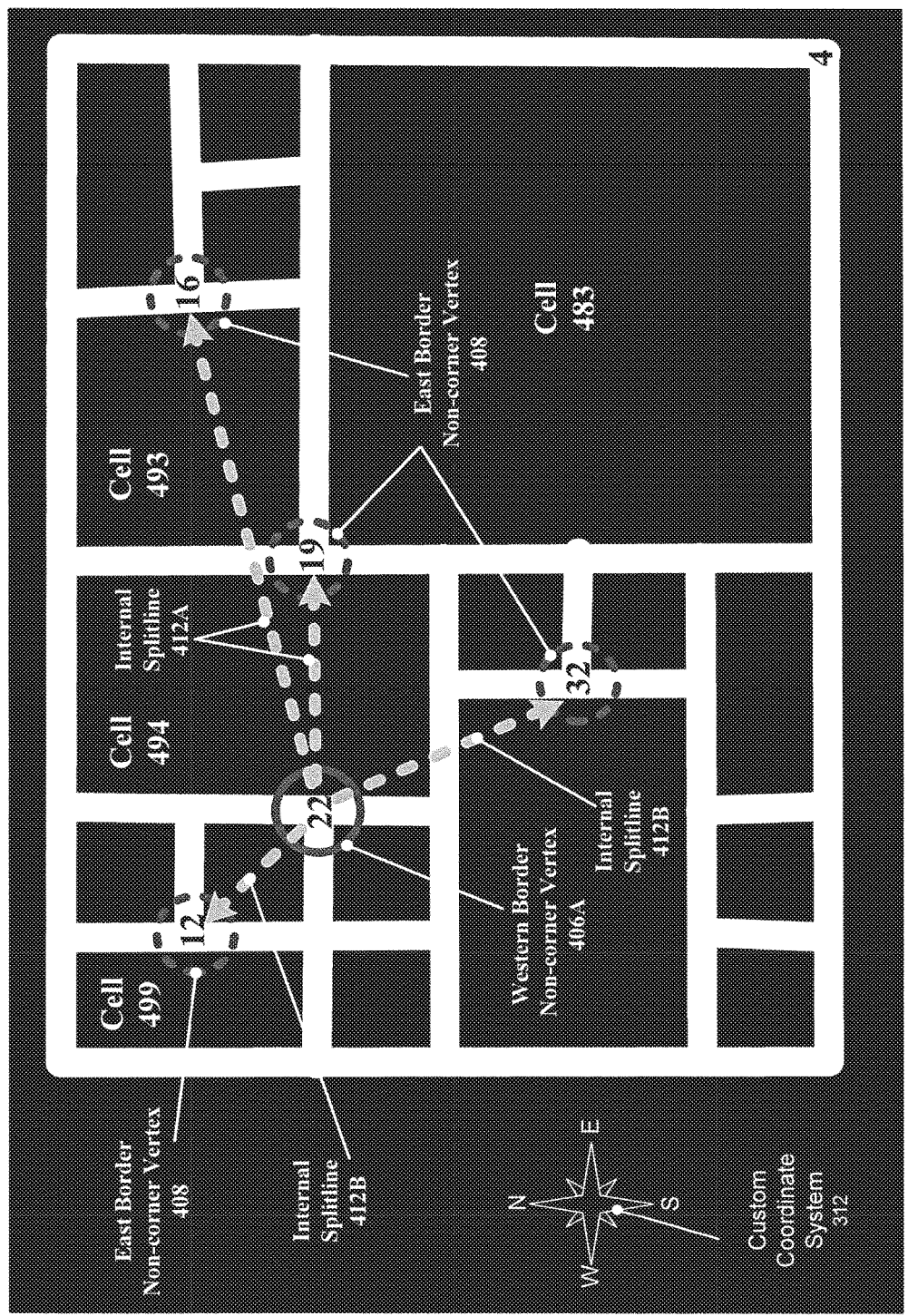
Figure 4E:
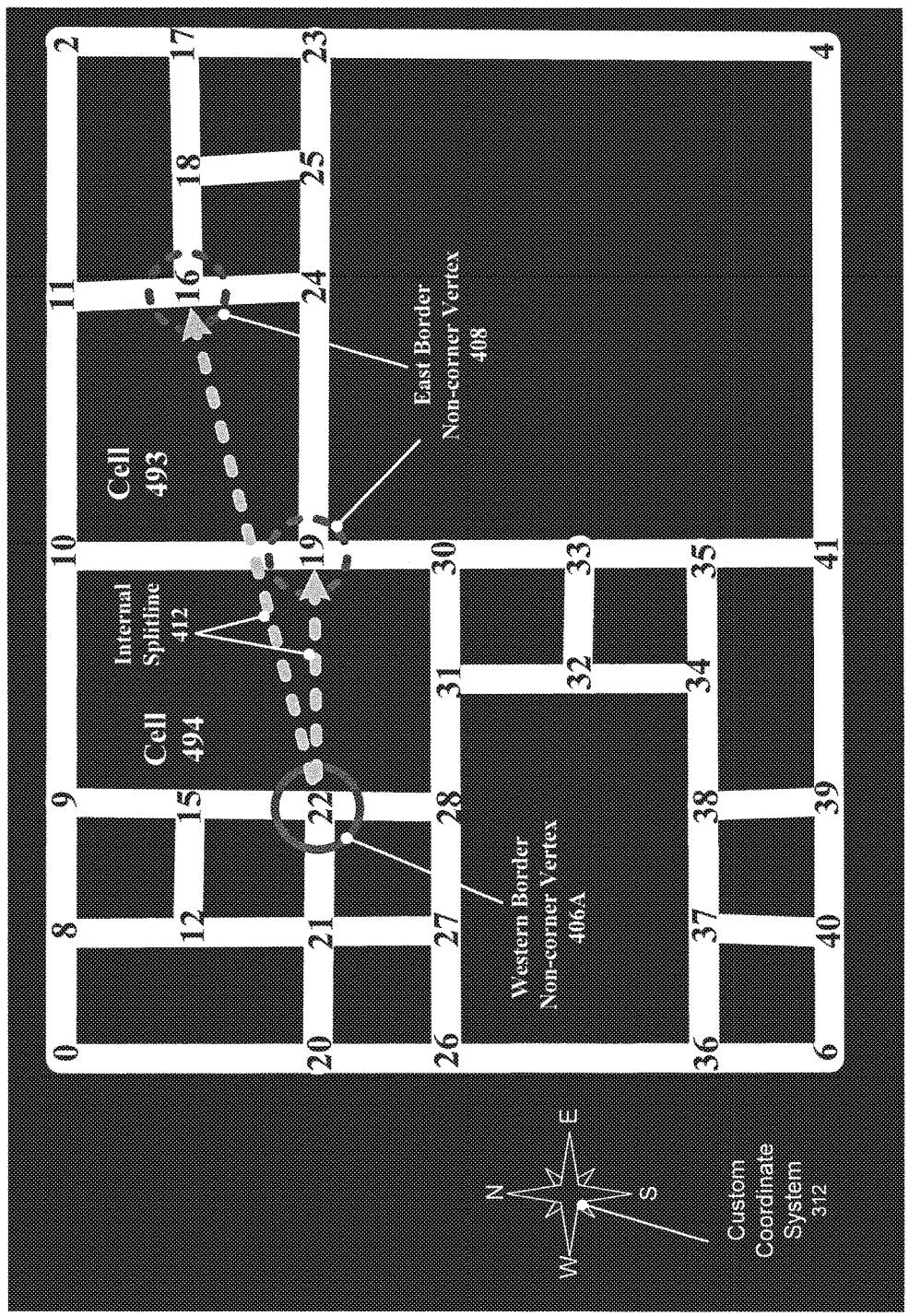
Figure 4F:
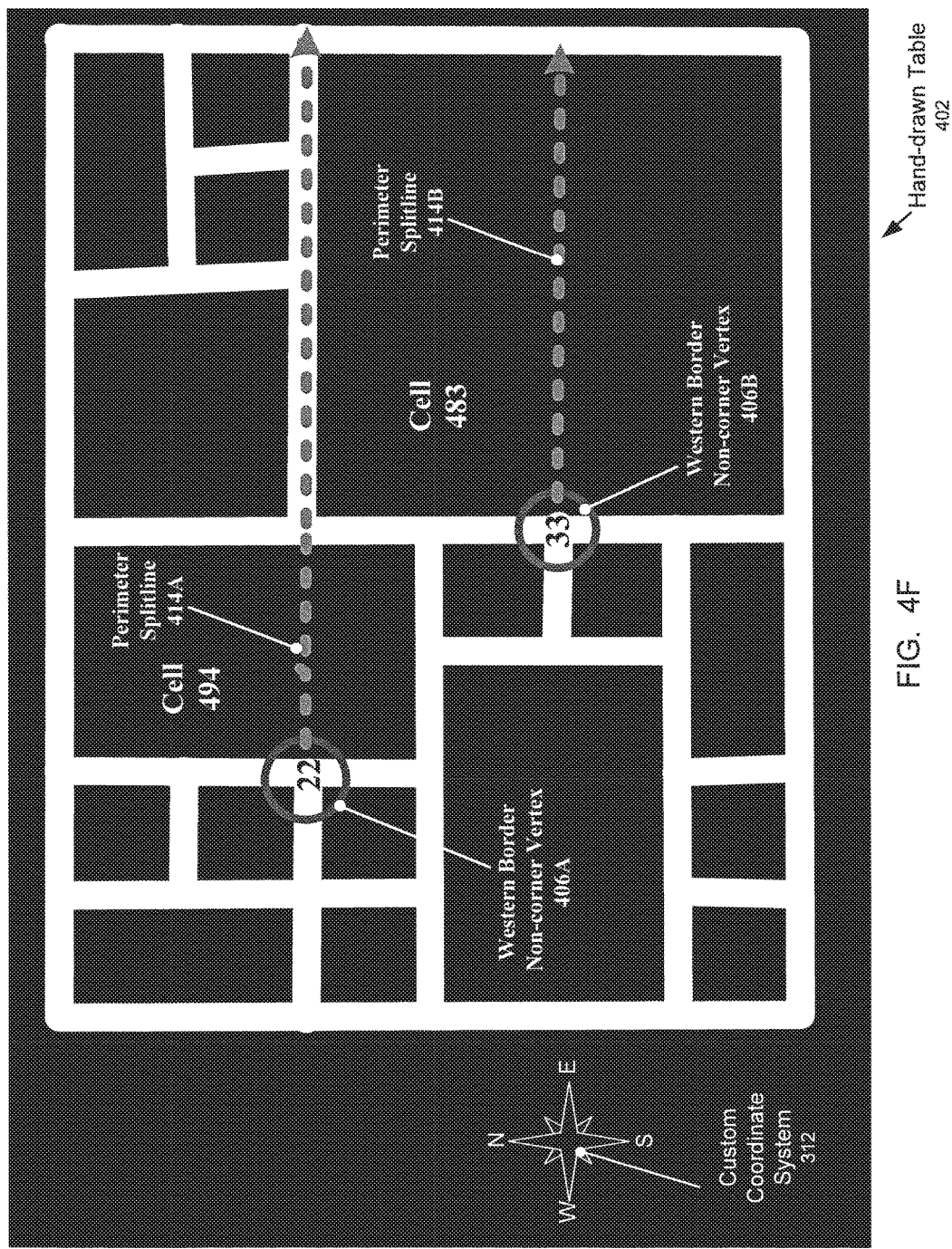

FIG. 4D-4F show the generation and discarding of splitlines for a selected non-corner vertex.

As seen in FIG. 4D, a western border non-corner vertex (406A) at vertex (22) of a cell (494) is selected and internal splitlines (412A, 412B) are generated between the selected western border non-corner vertex (406A) and each of the eastern border non-corner vertices (408).

As seen in FIG. 4E, all internal splitlines (412B) that do not intersect with (i.e., cross and/or make contact with) the eastern border of the cell (494) are discarded, while all internal splitlines (412A) that do intersect with the eastern border of the cell (494) and do not intersect with a northern or southern border of any cells in the table are retained.

As seen in FIG. 4F, a perimeter splitline (414A) is generated for the western border non-corner vertex (406A) at vertex (22). However, since this perimeter splitline (414A) intersects with (i.e., crosses and/or makes contact with) the northern border of cell 483, this perimeter splitline (414A) is discarded. As further seen in FIG. 4F, the perimeter splitline (414B) is generated for the western border non-corner vertex (406B). Since this perimeter splitline (406B) does not intersect with (i.e., cross and/or make contact with) any of the northern or southern borders of cell 483, this perimeter splitline (414B) is not discarded.

In one or more embodiments of the invention, the internal splitlines (412) and parameter splitlines (414) are generated for each of the western border non-corner vertices (406) and each of the eastern border non-corner vertices (408) shown in FIG. 4B. All internal splitlines that do not meet the criterion, as discussed above, are discarded.

FIG. 4G shows an example of a possible splitline data structure, as discussed above in reference to FIG. 1. As seen in FIG. 4G, the possible splitline data structure (416) includes all non-corner vertices and the splitlines (i.e., perimeter splitline and internal splitlines) for each non-corner vertex. As further seen in FIG. 4G, a confidence value, as discussed above in reference to FIG. 1 has been calculated for each splitline. Further, the splitlines are sorted, for each non-corner vertex, by confidence value, with the highest confidence value at the top and the smallest confidence value at the bottom.

FIG. 4H shows the possible splitline data structure (416) after the non-corner vertices have been sorted in the order starting from the non-corner vertices with only a single splitline at the top and the non-corner vertices having the highest number of splitlines at the bottom. As further seen in FIG. 4H, there are four non-corner vertices (i.e., vertex 19, vertex 15, vertex 16, vertex 22) that each have two possible splitlines. The four non-corner vertices (vertex 19, vertex 15, vertex 16, vertex 22) are sorted in the order starting with the non-corner vertex with the smallest minimum confidence value (i.e., conf=0.7) at the top and the non-corner vertex with the largest minimum confidence value (conf=0.72) at the bottom.

FIG. 4I shows an example of a final splitline data structure as discussed above in reference to FIG. 1. The final splitline data structure (418) is generated based on the selection of splitlines in STEPS 255-270 as discussed above in reference to FIGS. 2B and 2C from the possible splitline data structure (416) of FIG. 4H. As seen in FIG. 4I, all non-corner vertices in the possible splitline data structure (416) of FIG. 4H with only a single splitline are stored in the final possible splitline data structure (418). Further non-corner vertices in the possible splitline data structure (416) of FIG. 4H with more than one possible splitline are stored in the final possible splitline data structure (418) in the order as shown in the possible splitline data structure (416).

As seen in FIG. 4I, only non-corner vertex 19 and non-corner vertex 15 are stored in the final possible splitline data structure (418). This is a result of the splitline with the highest confidence of non-corner vertex 19 and the splitline with the highest confidence of non-corner vertex 15 overlapping with the splitline with the highest confidence of non-corner vertex 22 and the splitline with the highest confidence of non-corner vertex 16, respectively.

Figure 4J:
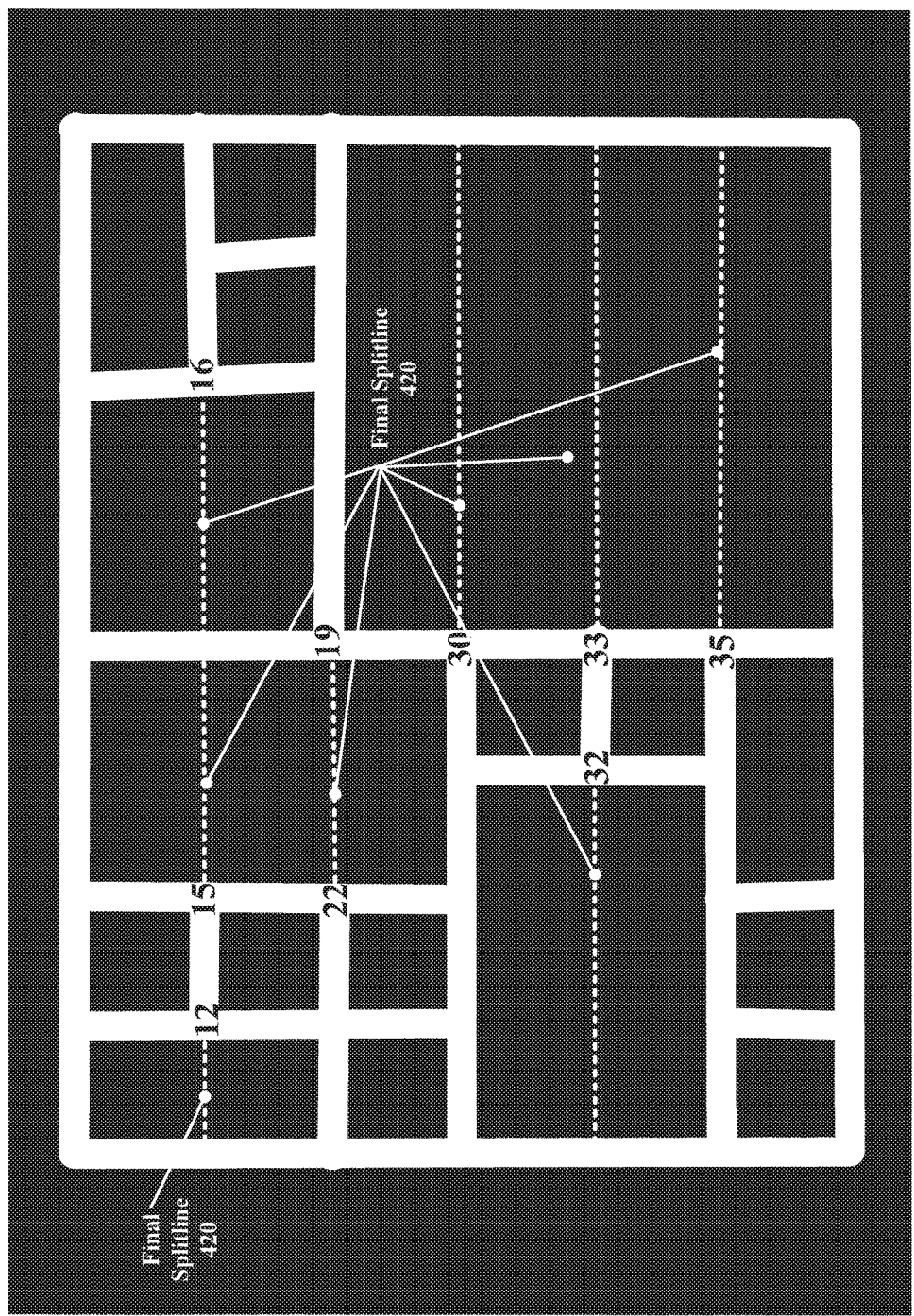

FIG. 4J shows the hand-drawn table (402) overlaid with final splitlines (420) generated by the merged cell splitting process for the east and west cardinal directions. Each of the final splitlines (420) corresponds to one of the splitlines stored in the final splitline data structure (418).

Figure 4K:
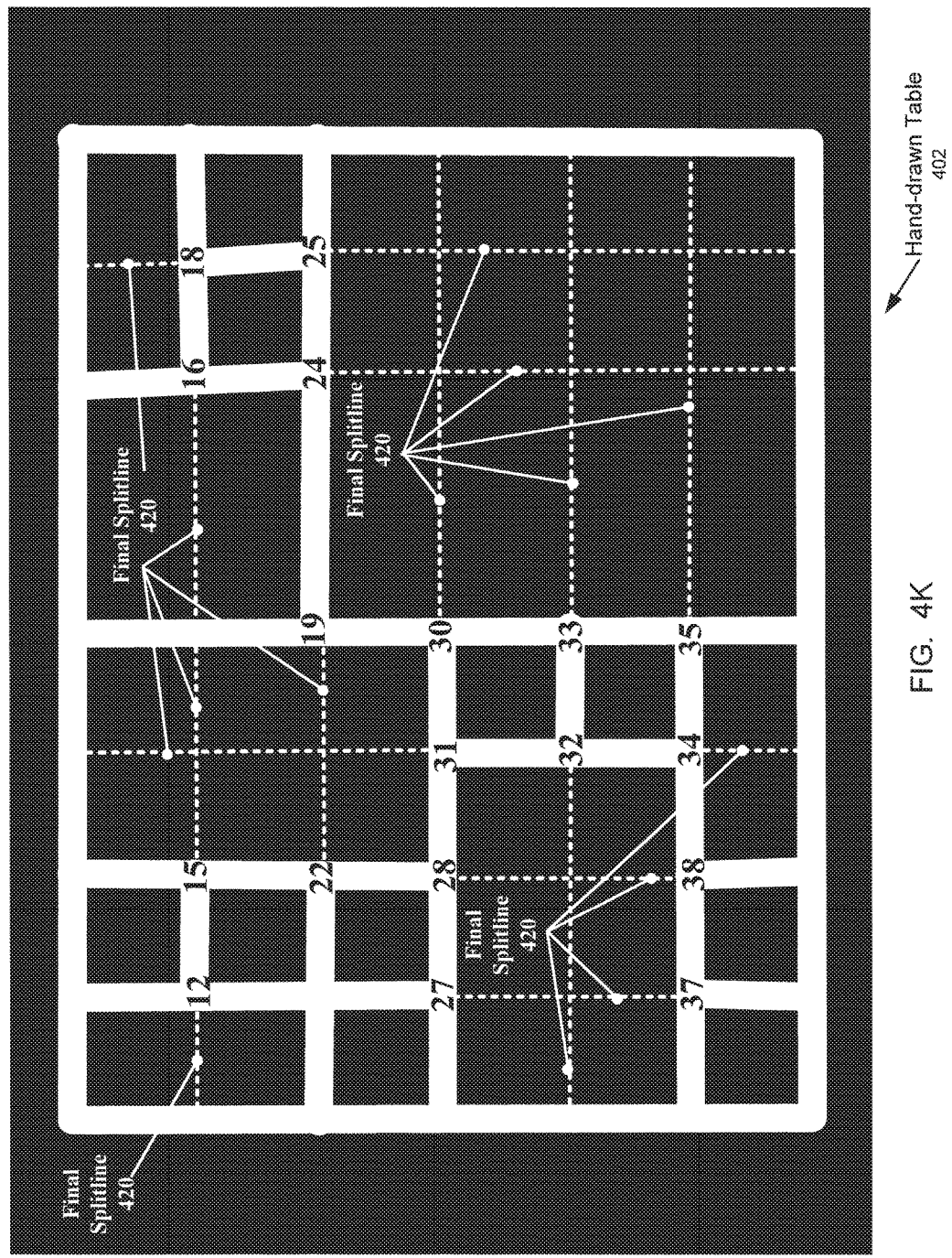

FIG. 4K shows the hand-drawn table (402) overlaid with the final splitlines (420) generated by the merged cell splitting process for all four cardinal directions (i.e., north, east, south, west). All of the final splitlines (420) will be replaced with one or more artificial edges that will be added to the skeleton graph to generate a corrected high-level representation of the hand-drawn table (402).

Figure 5:
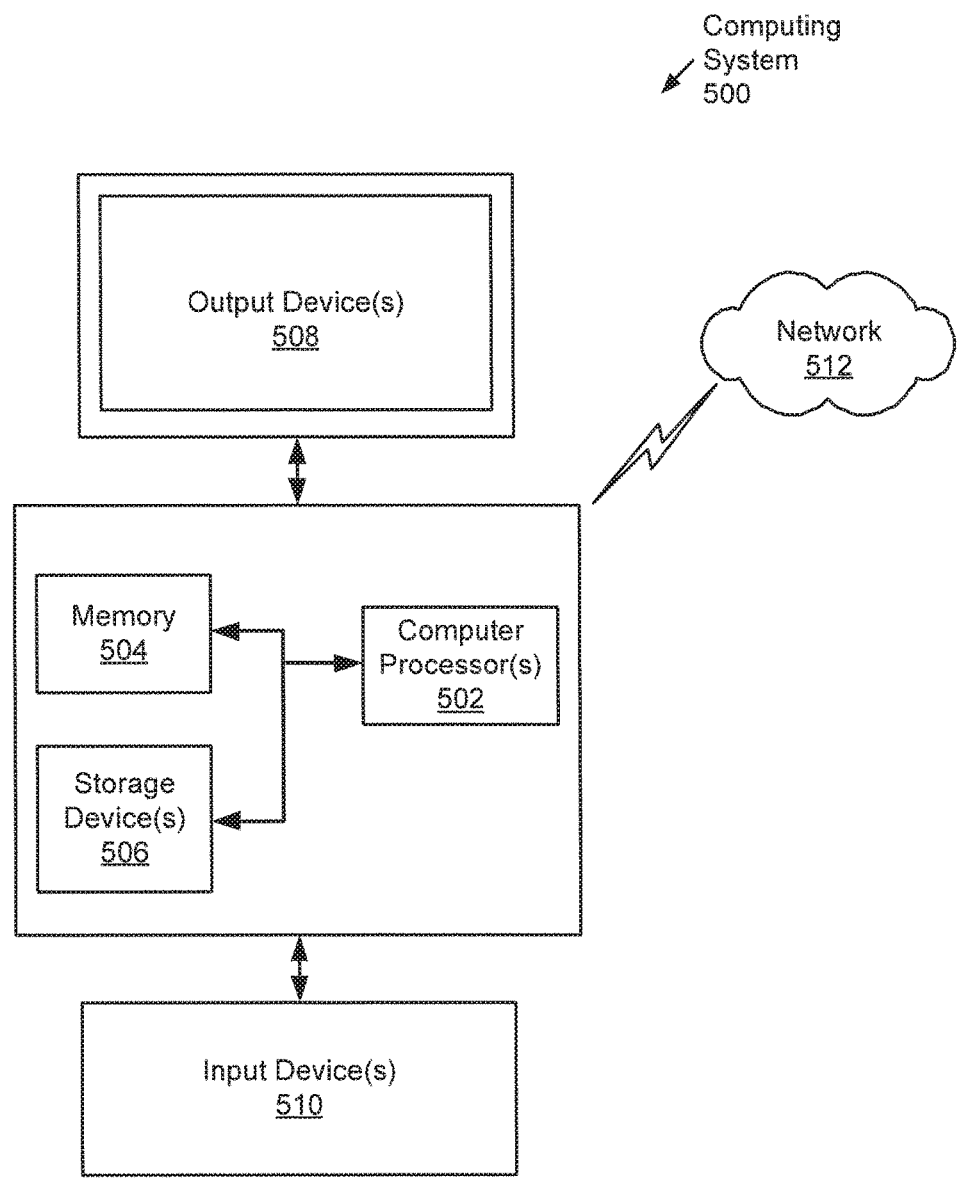
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
   obtaining an image comprising a table comprising a plurality of cells, wherein
      each cell in the plurality of cells comprises a first border, a second border opposite the first border, a third border, and a fourth border opposite the third border;
   identifying, on a skeleton graph with a plurality of vertices generated for the table, a first non-corner vertex on the first border of a first cell of the plurality of cells;
   determining a first plurality of splitlines extending from the first non-corner vertex and intersecting with the second border of the first cell without intersecting with the third or fourth border of the first cell;
   calculating a first plurality of confidence values for the first plurality of splitlines; and
   splitting the first cell by generating a first artificial edge, based on the first plurality of confidence values and a splitline of the first plurality of splitlines.

2. The method of claim 1, further comprising:
   identifying a second non-corner vertex on the second border of the first cell; and generating a second plurality of splitlines extending from the second non-corner vertex and intersecting with the first border without intersecting with the third or fourth border of the first cell; and determining a second plurality of confidence values for the second plurality of splitlines.

3. The method of claim 2, wherein:

the first plurality of splitlines comprises:
  a first internal splitline between the first non-corner vertex and the second non-corner vertex; and
  a first perimeter splitline between the first non-corner vertex and the perimeter of the table in the direction of the second border; and calculating the first plurality of confidence values comprises:
  calculating a plurality of lengths for the first plurality of splitlines; and
  determining a plurality of travel directions for the first plurality of splitlines.

4. The method of claim 3, wherein:

the second plurality of splitlines comprises a second internal splitline extending from the second non-corner vertex to the first non-corner vertex, and the second plurality of splitlines are discarded after determining that the first internal splitline overlaps the second internal splitline.

5. The method of claim 1, further comprising:

selecting a second cell of the plurality of cells;

identifying a second non-corner vertex on the second border of the second cell;

generating a second plurality of splitlines extending from the second non-corner vertex and intersecting with the first border of the second cell without intersecting with the third or fourth borders of the second cell; and calculating a second plurality of confidence values for the second plurality of splitlines.

6. The method of claim 5, further comprising:

selecting a splitline of the second plurality of splitlines having the highest confidence value of the second plurality of confidence values; and splitting the second cell by generating a second artificial edge based on the splitline of the second plurality of splitlines having the highest confidence value, wherein the splitline of the second plurality of splitlines extends from the second non-corner vertex on the second border of the second cell to the first non-corner vertex on the first border of the first cell.

7. The method of claim 2, further comprising:

selecting the first cell of the plurality of cells;

identifying a third non-corner vertex on the third border of the first cell;

generating a third plurality of splitlines extending from the third non-corner vertex and intersecting with the fourth border of the first cell without intersecting the first or second borders of the first cell; and calculating a third plurality of confidence values for the third plurality of splitlines; and splitting the first cell by generating a second artificial edge, based on the third plurality of confidence values and a splitline of the third plurality of splitlines.

8. The method of claim 1, further comprising:

generating an electronic document comprising a high-level representation of the table, wherein the high-level representation is based on the first artificial edge.

9. The method of claim 1, wherein the image comprises a writing board, and the table is hand-drawn on the writing board with a marker.

10. A non-transitory computer readable medium (CRM) storing computer readable program code embodied therein that:

obtains an image comprising a table comprising a plurality of cells, wherein
  each cell in the plurality of cells comprises a first border, a second border opposite the first border, a third border, and a fourth border opposite the third border;

identifies, on a skeleton graph with a plurality of vertices generated for the table, a first non-corner vertex on the first border of a first cell of the plurality of cells;

determines a first plurality of splitlines extending from the first non-corner vertex and intersecting with the second border of the first cell without intersecting with the third or fourth border of the first cell;

calculates a first plurality of confidence values for the first plurality of splitlines; and splits the first cell by generating a first artificial edge, based on the first plurality of confidence values and a splitline of the first plurality of splitlines.

11. The non-transitory CRM of claim 10, further storing computer readable program code embodied therein that:

identifies a second non-corner vertex on the second border of the first cell; and generates a second plurality of splitlines extending from the second non-corner vertex and intersecting with the first border without intersecting with the third or fourth border of the first cell; and determines a second plurality of confidence values for the second plurality of splitlines.

12. The non-transitory CRM of claim 11, wherein:

the first plurality of splitlines comprises:
  a first internal splitline between the first non-corner vertex and the second non-corner vertex; and
  a first perimeter splitline between the first non-corner vertex and the perimeter of the table in the direction of the second border; and calculating the first plurality of confidence values comprises:
  calculating a plurality of lengths for the first plurality of splitlines; and
  determining a plurality of travel directions for the first plurality of splitlines.

13. The non-transitory CRM of claim 12, wherein the second plurality of splitlines comprises a second internal splitline extending from the second non-corner vertex to the first non-corner vertex, and the second plurality of splitlines are discarded after determining that the first internal splitline overlaps the second internal splitline.

14. The non-transitory CRM of claim 10, wherein the image comprises a writing board, and wherein the table is hand-drawn on the writing board with a marker.

15. A system for image processing, comprising:

a memory;

a computer processor connected to the memory that:
  stores an image comprising a table comprising a plurality of cells, wherein
    each cell in the plurality of cells comprises a first border, a second border opposite the first border, a third border, and a fourth border opposite the third border;
  identifies, on a skeleton graph generated with a plurality of vertices for the table, a first non-corner vertex on the first border of a first cell of the plurality of cells;

determines a first plurality of splitlines extending from the first non-corner vertex and intersecting with the second border of the first cell without intersecting with the third or fourth border of the first cell;

calculates a first plurality of confidence values for the first plurality of splitlines; and splits the first cell by generating a first artificial edge, based on the first plurality of confidence values and a splitline of the first plurality of splitlines.

16. The system of claim 15, wherein the processor also:

identifies a second non-corner vertex on the second border of the first cell; and generates a second plurality of splitlines extending from the second non-corner vertex and intersecting with the first border without intersecting with the third or fourth border of the first cell; and determines a second plurality of confidence values for the second plurality of splitlines.

17. The system of claim 16, wherein:

the first plurality of splitlines comprises:

a first internal splitline between the first non-corner vertex and the second non-corner vertex; and a first perimeter splitline between the first non-corner vertex and the perimeter of the table in the direction of the second border; and calculating the first plurality of confidence values comprises:

calculating a plurality of lengths for the first plurality of splitlines; and determining a plurality of travel directions for the first plurality of splitlines.

18. The system of claim 17, wherein the second plurality of splitlines comprises a second internal splitline extending from the second non-corner vertex to the first non-corner vertex, and the second plurality of splitlines are discarded after determining that the first internal splitline overlaps the second internal splitline.

19. The system of claim 15, wherein the processor also:

generates an electronic document comprising a high-level representation of the table, wherein the high-level representation is based on the first artificial edge.

20. The system of claim 15, wherein the image comprises a writing board, and wherein the table is hand-drawn on the writing board with a marker.

* * * * *